United States Patent
Poonawala et al.

(10) Patent No.: US 12,541,577 B2
(45) Date of Patent: Feb. 3, 2026

(54) SYSTEMS AND METHODS FOR FACILITATING CLIENT AUTHENTICATION

(71) Applicant: Royal Bank of Canada, Toronto (CA)

(72) Inventors: Shabbir Poonawala, Toronto (CA); Venkati Brahmam Chinnari, Toronto (CA); Isaac Enkoom, Toronto (CA); Ekjot Multani, Toronto (CA); Anisha Mathur, Toronto (CA); Shu Wang, Toronto (CA); Adam Cheng, Toronto (CA)

(73) Assignee: Royal Bank of Canada, Toronto (CA)

( * ) Notice: Subject to any disclaimer, the term of this patent is extended or adjusted under 35 U.S.C. 154(b) by 167 days.

(21) Appl. No.: 18/237,215

(22) Filed: Aug. 23, 2023

(65) Prior Publication Data

US 2024/0070242 A1 Feb. 29, 2024

Related U.S. Application Data

(60) Provisional application No. 63/400,537, filed on Aug. 24, 2022.

(51) Int. Cl.
*G06F 21/31* (2013.01)
*G06Q 10/0635* (2023.01)

(52) U.S. Cl.
CPC .......... *G06F 21/31* (2013.01); *G06Q 10/0635* (2013.01); *G06F 2221/2103* (2013.01)

(58) Field of Classification Search
CPC ................................. G06F 21/31; G06F 21/46
See application file for complete search history.

(56) References Cited

U.S. PATENT DOCUMENTS

| | | | | |
|---|---|---|---|---|
| 9,633,322 | B1* | 4/2017 | Burger | G06Q 20/4014 |
| 11,537,706 | B1* | 12/2022 | Sharifi Mehr | G06F 21/33 |
| 11,641,368 | B1* | 5/2023 | Shah | H04L 63/083 |
| | | | | 726/6 |
| 2003/0154406 | A1* | 8/2003 | Honarvar | G07C 9/37 |
| | | | | 713/153 |
| 2004/0143750 | A1* | 7/2004 | Kulack | G06F 21/577 |
| | | | | 726/25 |
| 2005/0216768 | A1* | 9/2005 | Eppert | G06Q 20/40 |
| | | | | 726/5 |
| 2014/0189829 | A1* | 7/2014 | McLachlan | G06Q 20/4014 |
| | | | | 726/6 |
| 2017/0317993 | A1* | 11/2017 | Weber | H04L 63/08 |
| 2018/0240133 | A1* | 8/2018 | Lu | G06Q 30/0185 |
| 2019/0116181 | A1* | 4/2019 | Watanabe | H04L 63/04 |
| 2019/0238533 | A1* | 8/2019 | Pointner | G06F 21/566 |

(Continued)

OTHER PUBLICATIONS

C. Picard and S. Pierre, "RLAuth: A Risk-Based Authentication System Using Reinforcement Learning," in IEEE Access, vol. 11, pp. 61129-61143, 2023. (Year: 2023).*

(Continued)

*Primary Examiner* — Kari L Schmidt

(57) ABSTRACT

Methods, systems, and techniques for facilitating client authentication are disclosed, comprising: receiving an identifier of a client; retrieving client information based on the identifier of the client; assessing a plurality of risk indicators for the client from the client information; determining a risk level for the client based on the plurality of risk indicators; and outputting the risk level for display on a user device.

13 Claims, 14 Drawing Sheets

(56) References Cited

U.S. PATENT DOCUMENTS

2019/0259030 A1* 8/2019 Burger ............... G06Q 20/4014
2019/0295088 A1* 9/2019 Jia ............................ G06N 5/04
2019/0347666 A1* 11/2019 Bermudez-Cisneros ...................
                                                    G06Q 20/401
2022/0116390 A1* 4/2022 Jass ....................... H04W 12/06

OTHER PUBLICATIONS

Just, Mike, and David Aspinall. "Personal choice and challenge questions: a security and usability assessment." Proceedings of the 5th Symposium on Usable Privacy and Security. 2009, pp. 1-11. (Year: 2009).*

* cited by examiner

SYSTEMS AND METHODS FOR FACILITATING CLIENT AUTHENTICATION

CROSS-REFERENCE TO RELATED APPLICATIONS

This application claims priority to U.S. Provisional Patent Application No. 63/400,537, filed on Aug. 24, 2022, the entire contents of which is incorporated herein by reference for all purposes.

TECHNICAL HELD

The present disclosure is directed to methods, systems, and techniques for facilitating client authentication.

BACKGROUND

When a client calls into a contact center they are generally subject to authentication to verify their identity before disclosing any potentially sensitive information. Client authentication is particularly important in the financial industry where clients call in to discuss banking needs, and even more particularly in fraud and other departments of such banking institutions.

SUMMARY

According to a first aspect, a method for facilitating client authentication is disclosed, comprising: receiving an identifier of a client; retrieving client information based on the identifier of the client; assessing a plurality of risk indicators for the client from the client information; determining a risk level for the client based on the plurality of assessed risk indicators; and outputting the risk level for display on a user device.

In some aspects, the method further comprises determining that the client needs to be authenticated based on the risk level for the client.

In some aspects, the method further comprises generating authentication questions and answers for use in authenticating the client when it is determined that the client needs to be authenticated.

In some aspects, a number and difficulty of the authentication questions generated is based on the risk level for the client.

In some aspects, the difficulty of the authentication questions is determined from statistics of authentication questions previously asked to clients and whether the authentication questions were answered correctly.

In some aspects, the authentication questions are generated based on the retrieved client information.

In some aspects, the method further comprises determining an authentication level for the client based on the determined risk level.

In some aspects, the plurality of risk indicators comprise one or more risk indicators selected from the group of: whether the client is a new client, whether the client has a recent address or phone number change, whether the client has a high call volume, and whether the client has made a recent large transaction.

In some aspects, the method further comprises: determining whether the client has been previously authenticated within a predetermined amount of time; wherein determining the risk level for the client is further based on the determination of whether the client has been previously authenticated within the predetermined amount of time.

In some aspects, the method further comprises: receiving a real-time risk score for the client calculated from an integrated authentication application; wherein determining the risk level for the client is further based on the real-time risk score.

In some aspects, the method further comprises: generating and displaying insights related to the plurality of risk indicators.

According to another aspect, a system for facilitating client authentication is disclosed, comprising: a processor; and a non-transitory computer-readable memory having computer-executable instructions stored thereon, which when executed by the processor, configure the system to: receive an identifier of a client; retrieve client information based on the identifier of the client; assess a plurality of risk indicators for the client from the client information; determine a risk level for the client based on the plurality of assessed risk indicators; and output the risk level for display on a user device.

In some aspects, the computer-executable instructions, when executed by the processor, further configure the system to determine that the client needs to be authenticated based on the risk level for the client.

In some aspects, the computer-executable instructions, when executed by the processor, further configure the system to generate authentication questions and answers for use in authenticating the client when it is determined that the client needs to be authenticated.

In some aspects, a number and difficulty of the authentication questions generated is based on the risk level for the client.

In some aspects, the difficulty of the authentication questions is determined from statistics of authentication questions previously asked to clients and whether the authentication questions were answered correctly.

In some aspects, the authentication questions are generated based on the retrieved client information.

In some aspects, the computer-executable instructions, when executed by the processor, further configure the system to: determine whether the client has been previously authenticated within a predetermined amount of time; wherein determining the risk level for the client is further based on the determination of whether the client has been previously authenticated within the predetermined amount of time.

In some aspects, the computer-executable instructions, when executed by the processor, further configure the system to: receive a real-time risk score for the client calculated from an integrated authentication application; wherein determining the risk level for the client is further based on the real-time risk score.

In some aspects, the computer-executable instructions, when executed by the processor, further configure the system to generate and display insights related to the plurality of risk indicators.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

To authenticate a client, a contact center agent or other type of agent (e.g. credit card agent, fraud agent, etc.) will generally ask a series of authentication questions to the client, which if answered correctly, is generally deemed sufficient to authenticate the client.

Agents are typically provided with a list of questions used in authenticating clients that they will select questions from. However, agents may ask the same questions or the same subset of questions when authenticating clients, and moreover, the authentication questions asked to a given client may be repetitive (i.e. the client may be asked the same question or questions each time the client calls in), and/or may not be particularly pertinent to the client calling in (e.g. asking credit card related questions even though the client does not own a credit card with that institution). Accordingly, the current methods of having agents select questions to authenticate clients may be ineffective for verifying the client's identity.

Agents are also trained to look for red flags such as abnormal recent habits or a change in contact information in the client's history, however such information is not readily available for the agent to consider when the call with the agent is initiated. Further, there is often limited or no exchange of information between different departments within a business, such as between the general contact center and the credit card or fraud department of a banking institution. A client may therefore be asked the same authentication questions when engaging with each new department, which may result in a poor client experience if they have already been authenticated previously.

The present disclosure provides a web application for use by agents that leverages a machine learning classification model to help the agents authenticate clients. The web application generates a caller's risk level using a self-training semi-supervised model with Support Vector Machine (SVM) classification model, and assists agents by providing an authentication recommendation based on the risk level, generating additional insights about the client based on the client's profile, and automatically generating authentication questions and their respective answers for the agent. Therefore, agents are provided with enhanced decision-making ability to decide whether and the extent to which clients should be authenticated.

In at least some embodiments herein, methods, systems, and techniques for facilitating client authentication is disclosed, comprising: receiving an identifier of a client; retrieving client information based on the identifier of the client; assessing a plurality of risk indicators for the client from the client information; determining a risk level for the client based on the plurality of risk indicators; and outputting the risk level for display on a user device.

Figure 1:
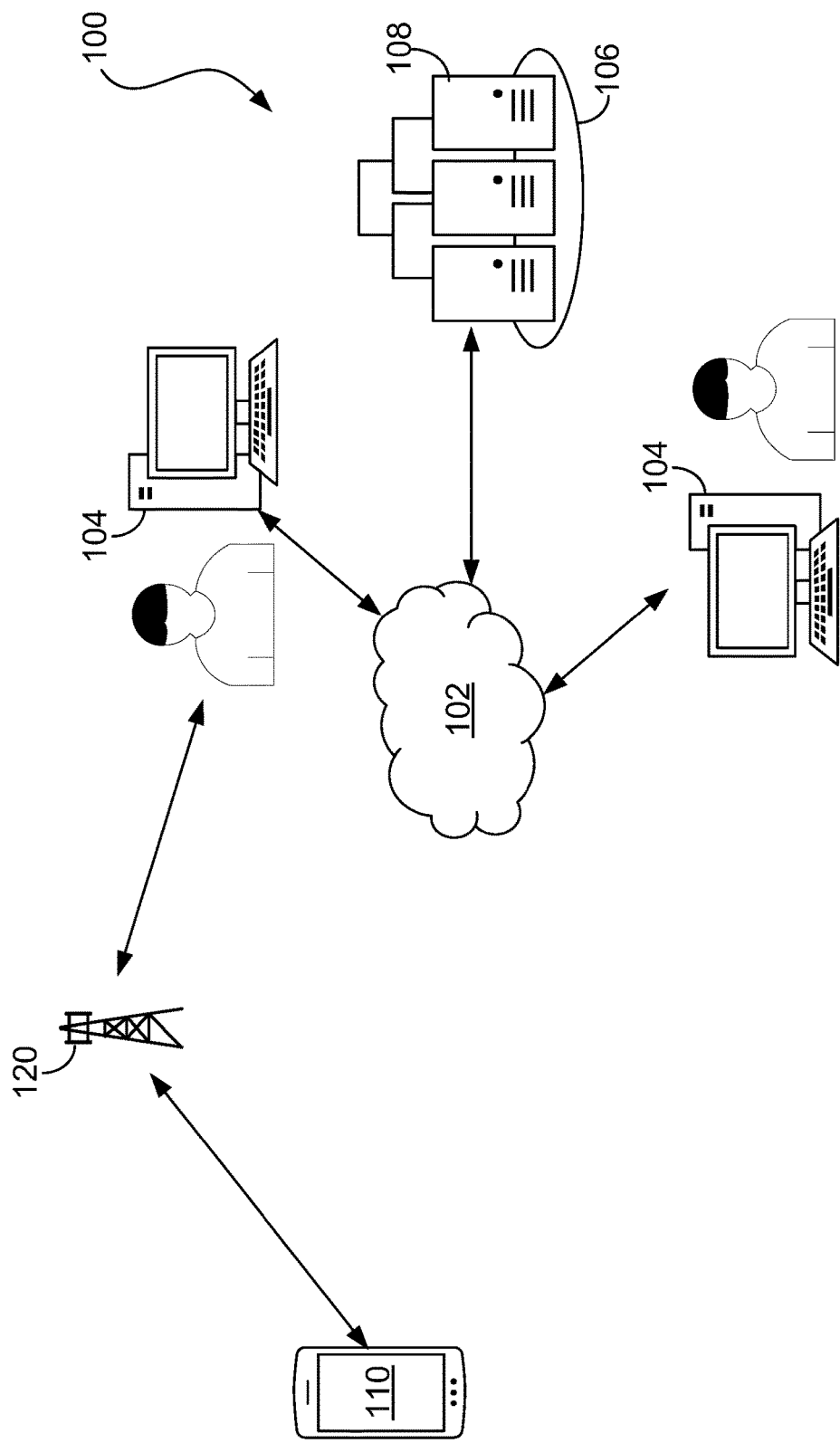
FIG. 1 shows a representation of a system for facilitating client authentication.

Referring now to FIG. 1, there is shown a computer network 100 that comprises an example embodiment of a system for facilitating client authentication. More particularly, the computer network 100 comprises a wide area network 102 such as the Internet to which various user devices 104 and data center 106 are communicatively coupled. The user devices 104 may be computing devices used by agents at an organization that receive calls from clients. The data center 106 comprises a number of servers 108 networked together to collectively perform various computing functions. The servers 108 may be distributed (cloud service). In accordance with the present disclosure, the data center 106 may host a web application for facilitating client authentication and that is accessible by the user devices 104 of the agents. A client device 110 may call the call center agent via a cellular network 120, and the call center agent can use the user device 104 to access the web application provided by the data center 106 to facilitate authentication of the client.

Figure 2:
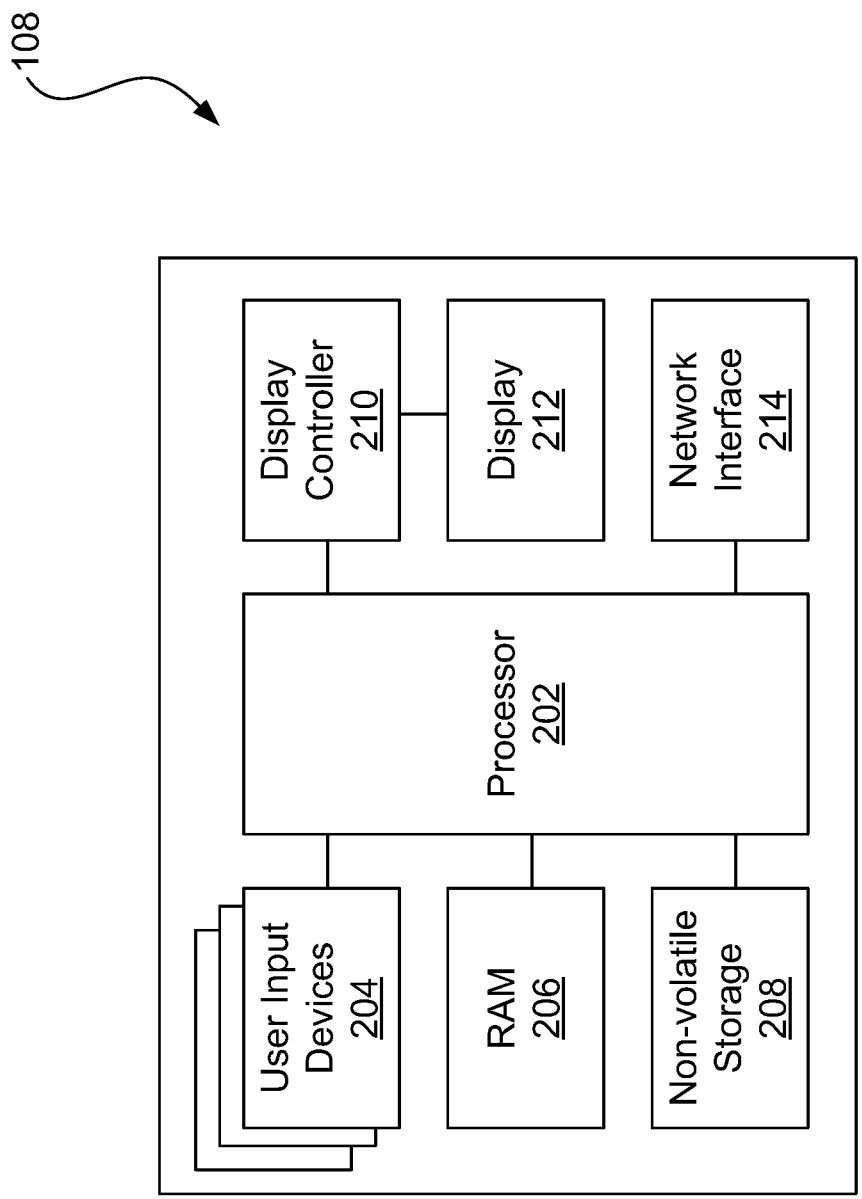
FIG. 2 shows a representation of hardware components of an application server.

Referring now to FIG. 2, there is depicted an example embodiment of one of the servers 108 that comprises the data center 106. The server comprises a processor 202 that controls the server's 108 overall operation. The processor 202 is communicatively coupled to and controls several subsystems. These subsystems comprise user input devices 204, which may comprise, for example, any one or more of a keyboard, mouse, touch screen, voice control; random access memory ("RAM") 206, which stores computer program code for execution at runtime by the processor 202; non-volatile storage 208, which stores the computer program code executed by the RAM 206 at runtime; a display controller 210, which is communicatively coupled to and controls a display 212; and a network interface 214, which facilitates network communications with the wide area network 104 and the other servers 108 in the data center 106. The non-volatile storage 208 has stored on it computer program code that is loaded into the RAM 206 at runtime and that is executable by the processor 202. When the computer program code is executed by the processor 202, the processor 202 causes the server 108 to implement a method for facilitating client authentication as described in more detail herein. Additionally or alternatively, the servers 108 may collectively perform that method using distributed computing. While the system depicted in FIG. 2 is described specifically in respect of one of the servers 108, analogous versions of the system may also be used for the user devices 104.

Figure 3:
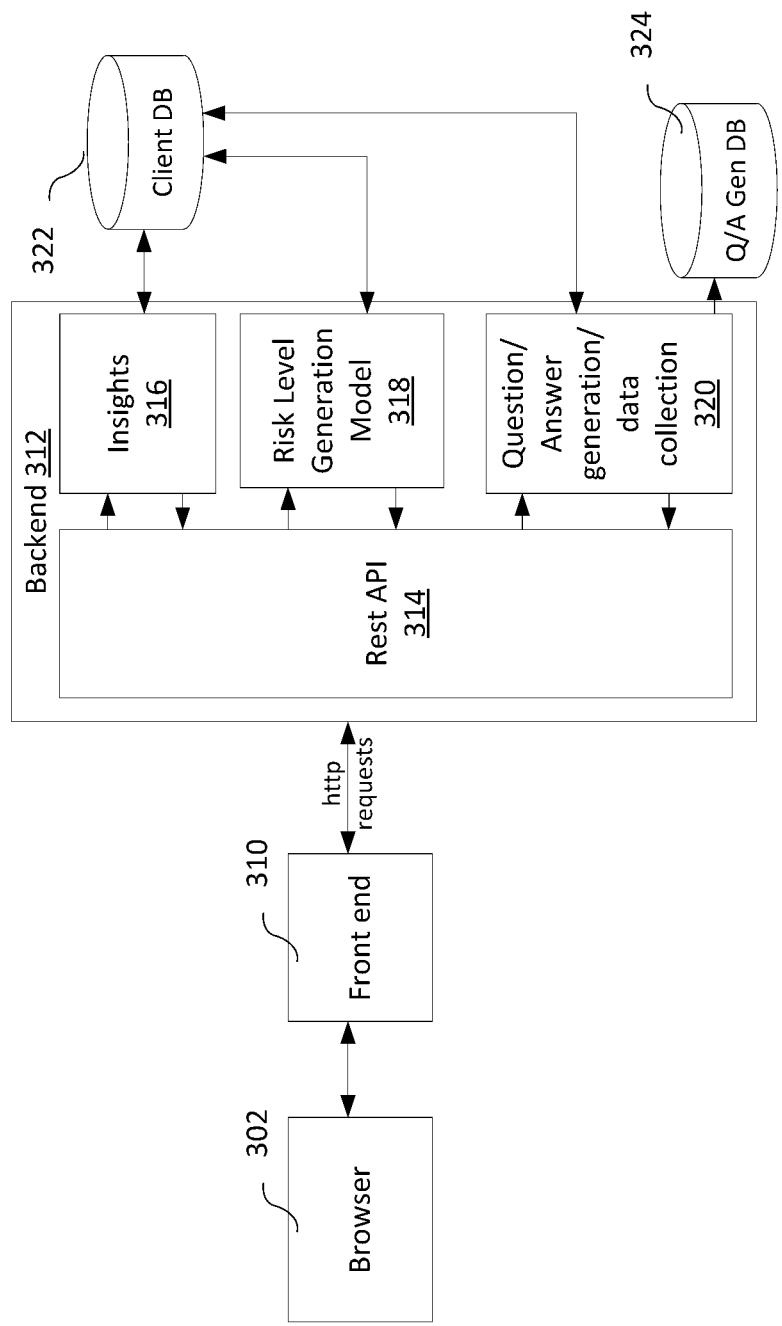
FIG. 3 shows a system architecture of a platform facilitating client authentication.

FIG. 3 shows a system architecture of a platform facilitating client authentication. A browser 302 operating on a user device (e.g. user device 104 in FIG. 1) may be used to access the web application and communicates with application front-end 310. The application front-end 310 exchanges information via HTTP requests with application backend 312, which comprises an API 314 (e.g. a REST API) configured to make API calls to different components of the system. In particular, the application backend 312 further comprises an insights engine 316, a risk level generation model 318, and a questions/answers generation component 320. The application backend 312 is also configured to access a client database 322 storing client information for the clients of the organization, and a questions/answers database 324. The questions/answers database 324 may store authentication questions that may be used for authenticating clients as well as data including authentication questions that were previously asked to clients and whether the clients answered the questions correctly or incorrectly. The data including authentication questions that were asked to clients and the clients' answers may be stored for all departments that the client calls into within an organization.

As will be further described herein, the application back-end 312 is configured to access the client database 322 to retrieve client information for use in facilitating client authentication. The client information retrieved from the client database 322 is used to assess a plurality of risk indicators for the client, or "red flags" of the client. Internal policy documents will often list some red flags that agents should look at while they are on call with clients, however there is typically no marking or data to indicate these red flags for incoming calls. In accordance with the present system, the risk indicators assessed based on the client information may be used to generate insights of the client by the insights engine 316, which may be conveniently displayed for the agent in the browser 302. The risk indicators may include whether the client is a new client, whether the client has a recent address or phone number change, whether the client has a high call volume, and whether the client has made a recent large transaction, for example.

Further, the risk indicators may be provided to the risk level generation model 318, which may be implemented as a self-training semi-supervised classification model with a support vector machine (SVM), as further described with reference to FIG. 6. The classification model is used to predict a risk level for the client based on the plurality of risk indicators (e.g. low risk, medium risk, or high risk). The determined risk level may be used to determine whether and to what extent the client should be subject to authentication. In some implementations, the risk level may be used to determine an authentication level of the client, indicative of a degree of authentication required.

The questions/answers generation component 320 is configured to access the questions/answers database 324 to generate authentication questions for the clients, and to access the client database 322 to determine which authentication questions are relevant as well as to determine the answers to the authentication questions for the client. The number and difficulty of authentication questions may be based on the risk level determined from the risk level generation model 318. Further, the authentication questions can be tailored to the client's information retrieved from the client database 322, and the questions/answers database 324 may also store previous questions provided to the client being authenticated so that the questions/answers generation component 320 does not repeat the same questions, including questions asked by other departments on separate occasions. Further, the authentication questions stored in the questions/answers database 324 may be stored in association with a time stamp indicating when a client was asked the question and whether the question was answered correctly, which may be analyzed to generate statistics of which questions are easy or hard. The questions/answers generation component 320 may then be able to specifically generate easy or hard authentication questions for the client (e.g. based on the risk level of the client).

As mentioned, the system is also configured to interface across different departments within an organization. The datasets of client authentication being performed by different departments may be stored in separate locations. The application backend 312 may also be configured to access one or more database(s) (not shown) storing client authentication data of other departments. For example, the client authentication data from another department may indicate whether the client was successfully authenticated by the agent in that department. Further, different departments may use different authentication tools to determine risk scores of clients calling in. Accordingly, the application back-end 312 can access other department's datasets to determine any risk scores generated by authentication tools of that department. The client authentication data from other departments (e.g. whether the client was verified and date of verification, risk score(s) calculated by various authentication tools, etc.) may also be used as inputs to the risk level generation model 318 to generate a risk level for the client. One particular implementation of using other department's datasets may be when the call is transferred from a general call center department to a more specific department such as a fraud department. The application backend 312 can access the call center department's dataset and view whether the client calling in was authenticated.

The system may also be configured to use Natural Language Processing (NLP) to facilitate client authentication. In some examples, NLP may be used to take automated notes about the client during the call with the agent. These notes may be stored in association with the client information, such as in the client database 322, and used to generate insights on future calls. Additionally or alternatively, NLP may be used to determine whether the client correctly answers authentication questions. An extension of using NLP to evaluate client answers is that authentication questions may be provided with an interactive voice response system used to authenticate the client. With this technology, the client may be authenticated before even being connected with the agent, and/or if the client is unable to be authenticated, they may be deemed high risk and the agent appropriately notified.

Figure 4:
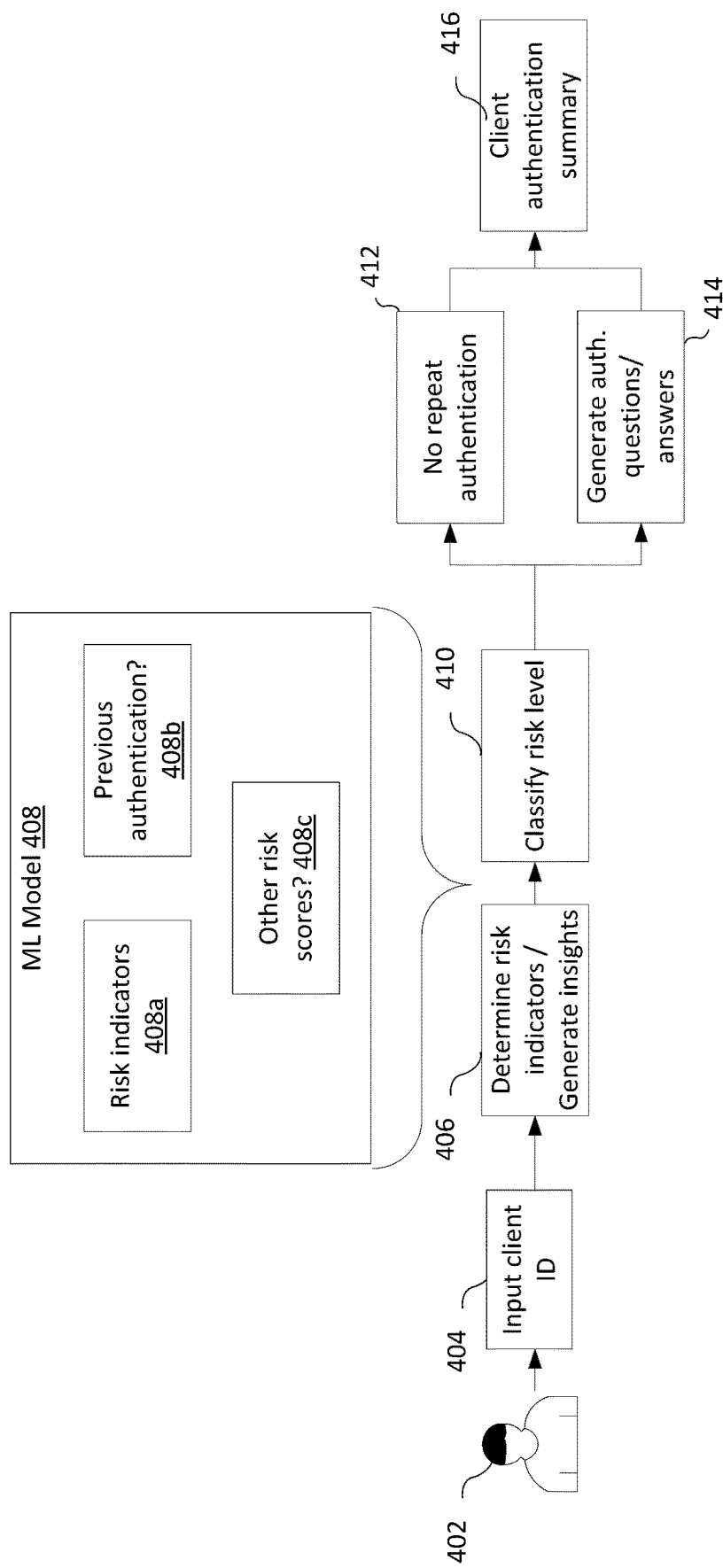
FIG. 4 shows a process flow diagram for facilitating client authentication.

FIG. 4 shows a process flow diagram for facilitating client authentication. A client identifier such as a Service Reference File (SRF) Number is input into the web application when the call with the client is initiated with an agent 402 (404). Inputting the client identifier may be performed manually by the agent, or automatically when the call is connected. A plurality of risk indicators are determined for the client and used to generate insights (406). For example, the plurality of risk indicators may be determined by accessing the client database 322, and determining one or more of: whether the client is a new client, whether the client has a recent address or phone number change, whether the client has a high call volume, and whether the client has made a recent large transaction.

A machine learning model 408 classifies a risk level (410) for the client using the plurality of risk indicators (408a) and possibly other available information such as whether the client has been previously authenticated within a predetermined period of time (e.g. by a user in the same department or another department that the client is currently calling into) (408b), and/or a real-time risk score for the client calculated from an integrated authentication application such as Pindrop (408c). The risk level is used to recommend whether the client needs to be authenticated and possibly a degree of authentication required. For example, the risk levels may comprise Risk Levels 1, 2, or 3. Risk Level 1 may require no repeat authentication (412) (e.g. where the client has just been authenticated by another department). Risk Levels 2 and 3 may require asking authentication questions, and the authentication questions and corresponding answers for the client are generated for the agent (414). A number and/or difficulty of the authentication questions may depend on the risk level. A client authentication summary may be displayed (416), which provides the agent with client insights and authentication questions/answers.

FIGS. 5A to 5F show a data processing flow 500 to generate a dataset for the classification model. A dataset for the client is accessed (502). The dataset may generated from the incoming call information, and for a financial institution may comprise a card number (e.g. credit card number) and a call timestamp. In some instances a call may be initiated through an application on a client device storing certain client information. Information from the card number is extracted to determine client identification information, which is added to the dataset (504). The dataset is used to assess a plurality of risk indicators for the client, as well as to obtain other relevant risk factors, as described with reference to FIGS. 5B to 5F.

Figure 5A:
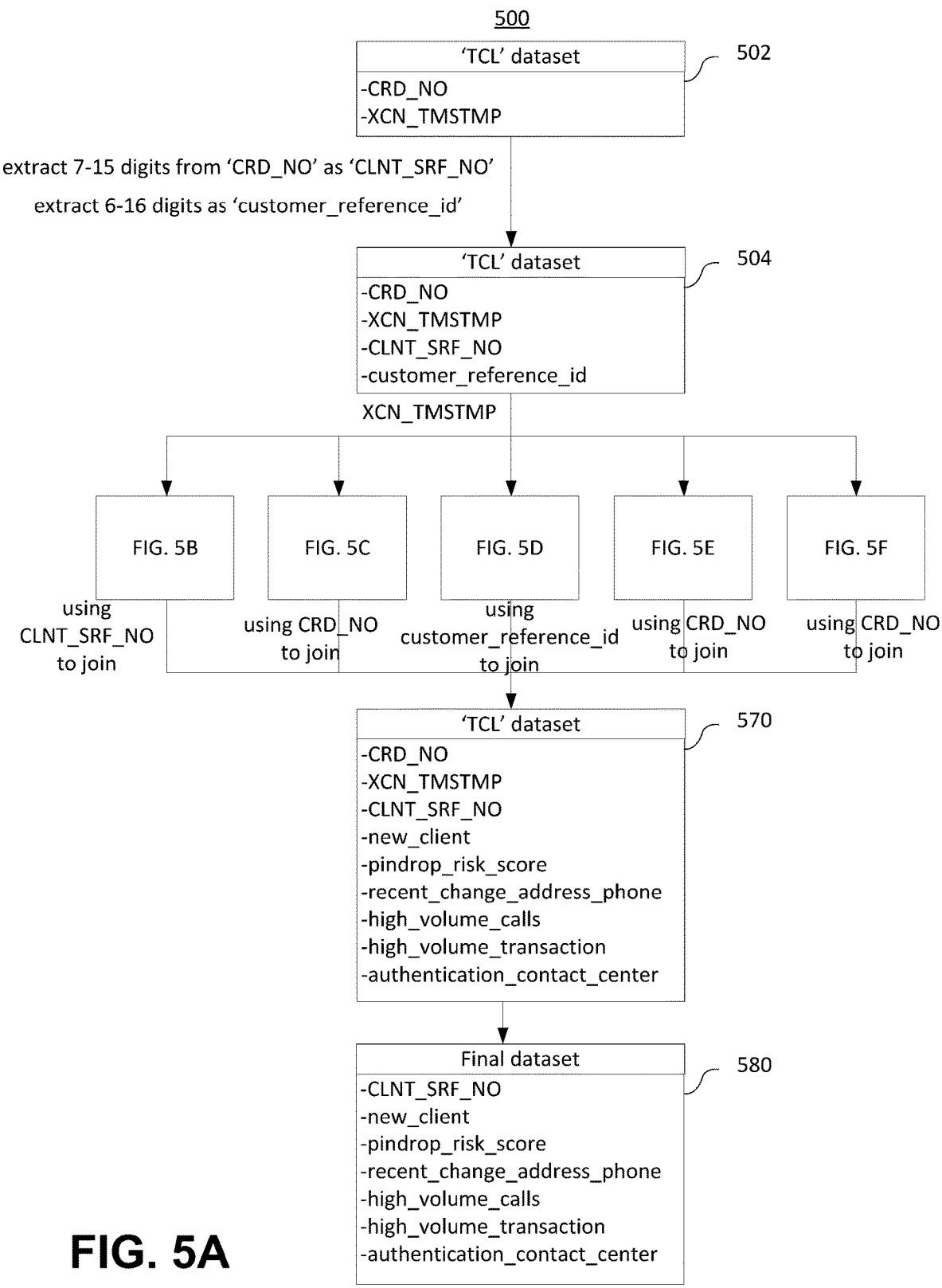
FIGS. 5A-5F show a data processing flow to generate a dataset for the classification model.
Figure 5B:
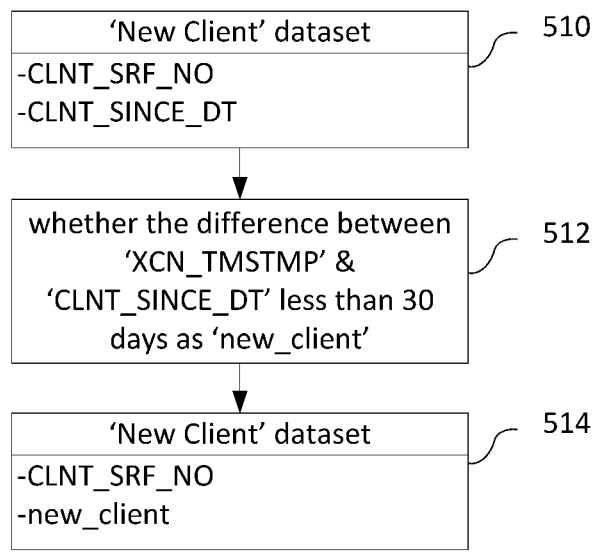

For example, referring to FIG. 5B, a determination may be made as to whether the client is a new client. A "client since date" can be retrieved for the client identification information (510), a determination can be made using the call timestamp as to whether the client has been a client for more than a predetermined amount of time (e.g. 30 days) (512), and if not the client may be determined to be a new client (514). Referring back to FIG. 5A, a new client indication may be added to client dataset 570.

Figure 5C:
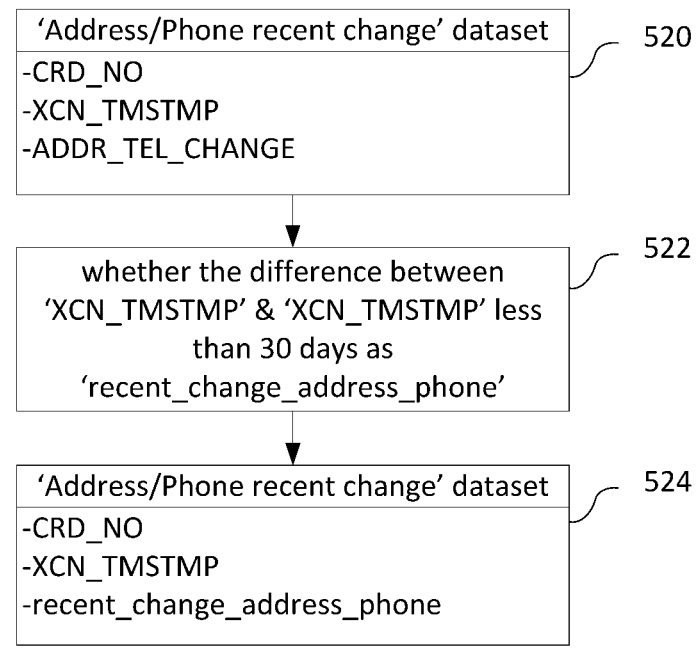

Further, with reference to FIG. 5C, a determination may be made as to whether the client has had a recent address/phone number change. Data indicative of an "address/telephone change" can be retrieved for the client identification information (520), a determination can be made using the call timestamp as to whether the client has been a client has had an address or telephone number change within a predetermined amount of time (e.g. 30 days) (522), and if so a recent address/phone change is determined (524), and a corresponding recent address/phone change indication may be added to client dataset 570. Additionally or alternatively, the recent address/phone change may be provided as a number of days since the last change.

Figure 5D:
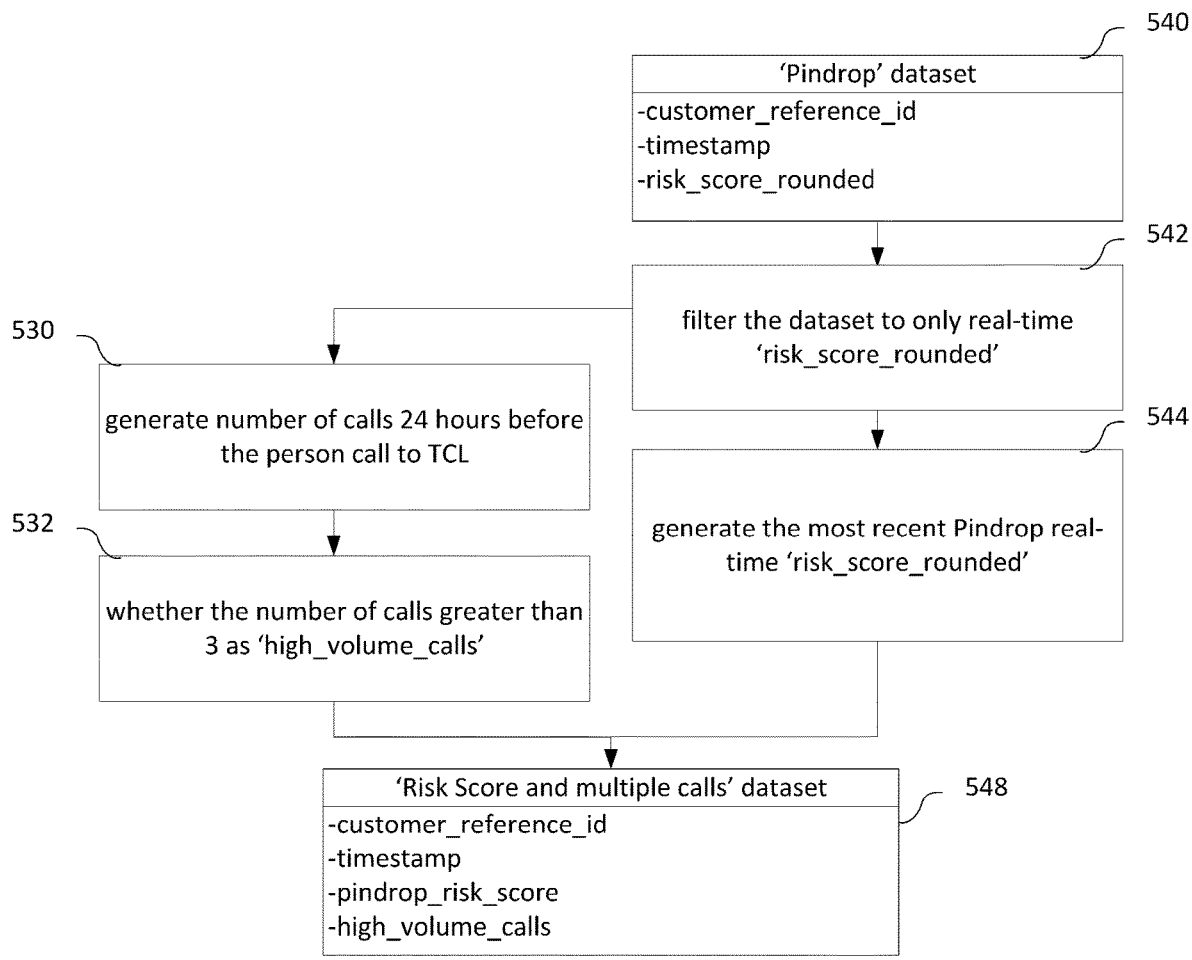

Referring to FIG. 5D, another determination may be made as to whether the client has a high call volume. The call timestamp may be used to determine the number calls made to the organization and/or the specific department 24 hours before the current call (530), a determination can be made whether the number of calls exceeds a predetermined threshold (e.g. "3") (532), and if so, an indication of high call volume may be added to a client calls dataset 548, and in turn client dataset 570. Additionally or alternatively, the call rate may be expressed over different periods of time such as days, past three days, past week, months etc.

Another determination may also be made as to whether a risk score has been calculated by another authentication application. For example, Pindrop is a tool that runs voice recognition on calls and check certain other indicators, such as if the caller is using the registered mobile number to make the call, if the IP address of the transaction was same as the usual IP address, etc., to give out a risk score. The application dataset may be accessed (540) and filtered for risk score type (542) to get a real time risk score. The most recent real-time risk score is determined (544). As previously described, it is possible that the authentication tool may not be used by all departments within an organization, and accordingly, the real-time risk score may be calculated for either a current call or for a call with another department that just transferred the client and used the application. It will also be appreciated that other risk scores calculated by other authentication tools may be accessed and used in accordance with the methods described herein. The most recent risk score may be added to client calls dataset 548, and in turn client dataset 570.

Figure 5E:
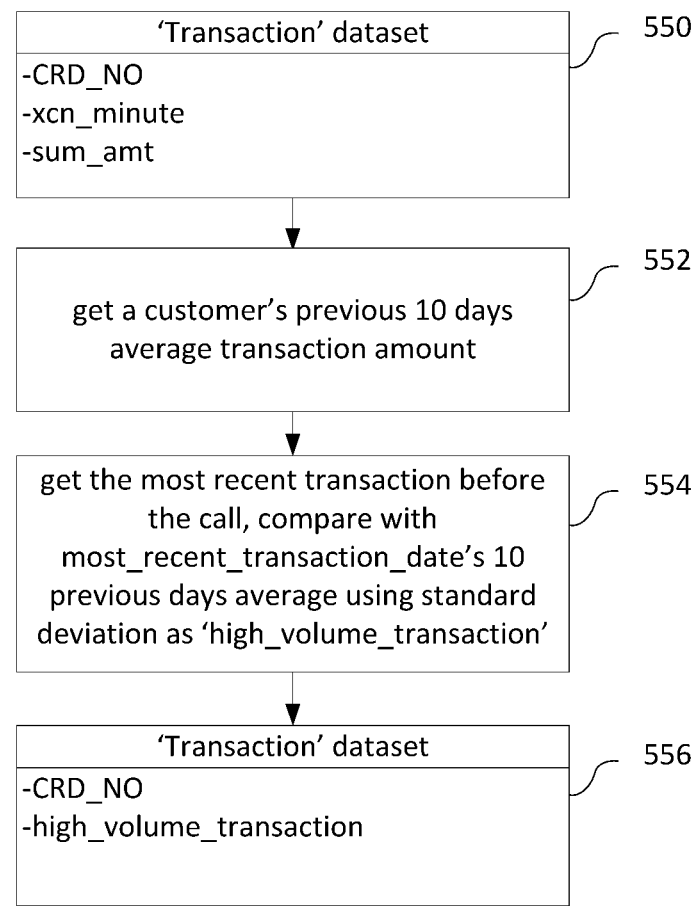

Referring to FIG. 5E, another determination may be made as to whether the client made a recent high volume transaction(s). Transaction data can be retrieved for the client identification information (550) and used to retrieve a total number of the client's previous transactions over a predetermined number of days (e.g. last 10 days) (552), as well as a most recent transaction before the call so that a determination can be made as to whether the most recent transaction was a high volume transaction (554). In one example, the most recent transaction can be compared with the previous transactions and assessed to determine if it is a high volume transaction based on standard deviation (e.g. if the amount is one standard deviation above the average). Alternatively, outlier machine learning detection can be employed. When the most recent transaction is determined to be a high volume transaction, a high volume transaction indication is generated (556) and added to client dataset 570.

Figure 5F:
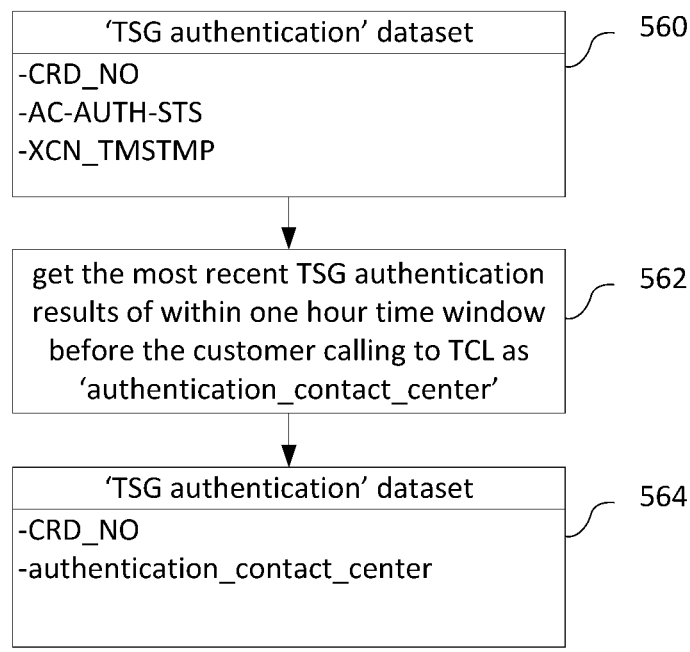

Referring to FIG. 5F, another determination may be made as to whether the client has been recently authenticated by another department, such as a department that spoke to the client and then transferred the client's call. The dataset of other department(s) may be accessed (560), and a determination may be made to determine if that department has authenticated the client within a recent period of time (562) (e.g. the last hour), and if the client has recently been authenticated by that department, an indication may be generated (564) and added to client dataset 570.

Referring back to FIG. 5A, the client dataset 570 is used to generate a model input dataset 580 for the client, which is input into the risk level generation model and used to determine a risk level for the client.

Figure 6A:
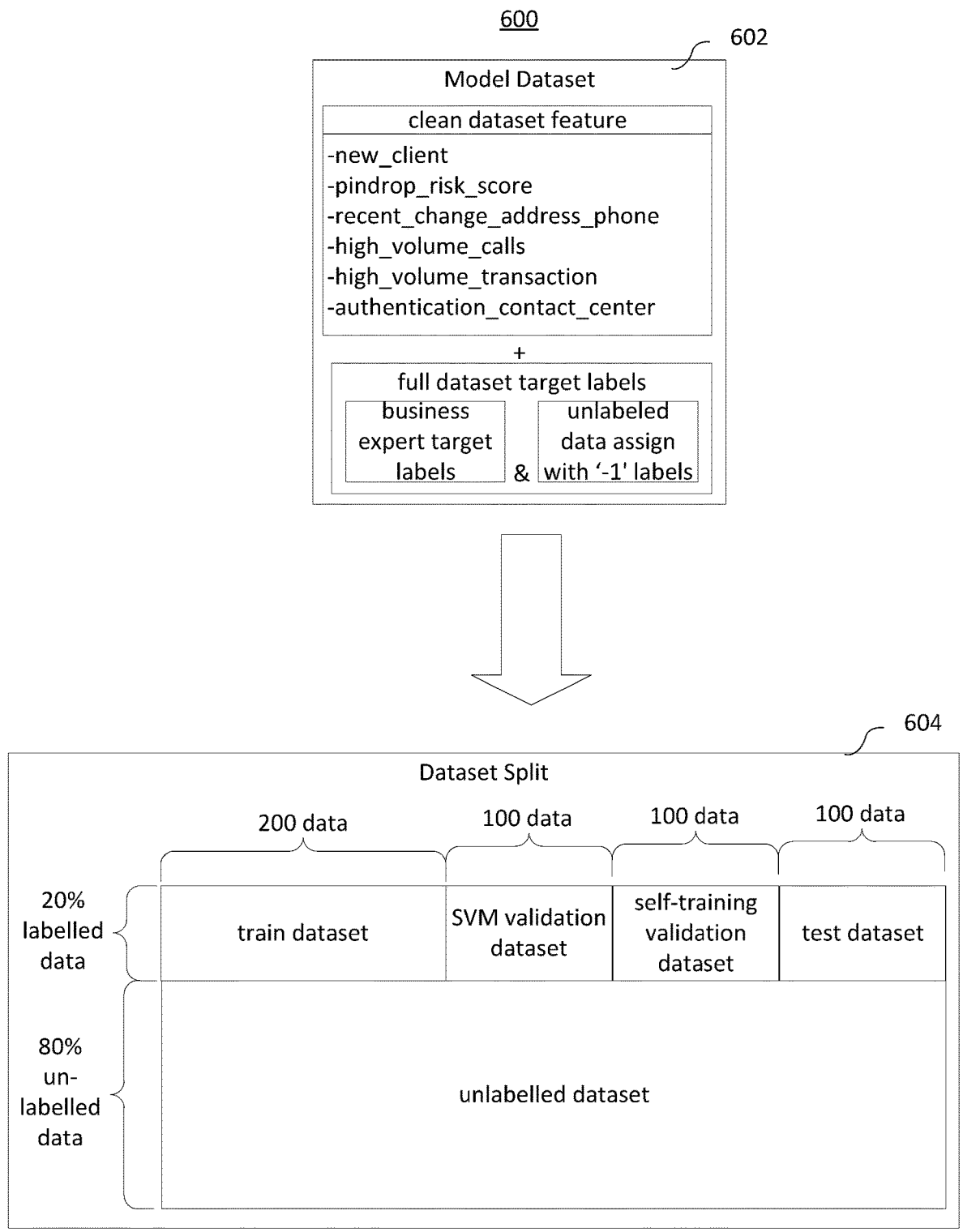
FIGS. 6A and 6B show a process flow for the risk level classification model.
Figure 6B:
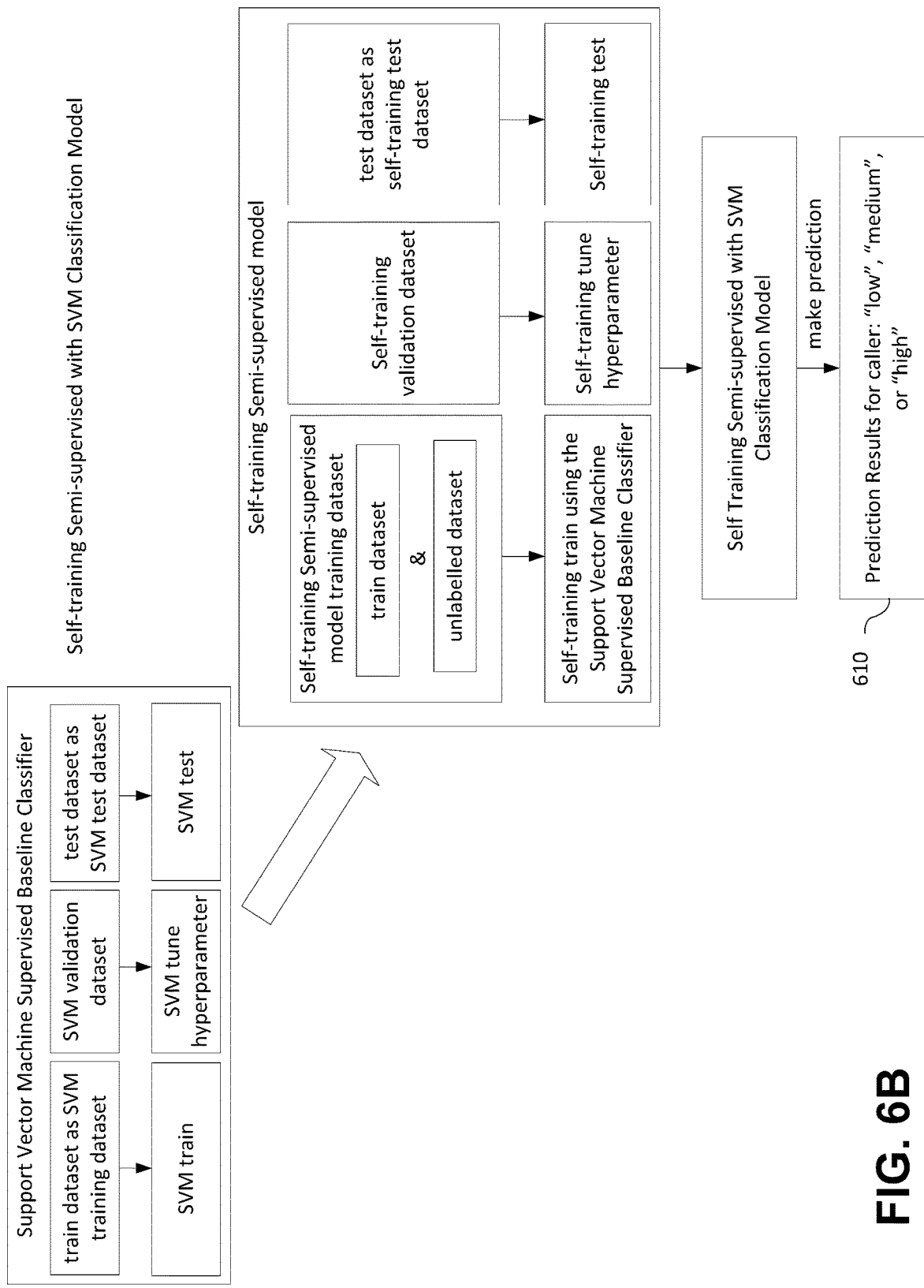

FIGS. 6A and 6B show a process flow 600 for the risk level classification model. The classification model in this example is a self-training semi-supervised Classification Model with Support Vector Machine (SVM) that is configured to predict a risk level for the client. However, it will be appreciated that other types of classification models may be used.

The model dataset 602 comprises labelled and unlabeled data. The dataset comprises the information contained in a client dataset as described above, including risk indicators (i.e. whether the client is a new client, whether the client has a recent address or phone number change, whether the client has a high call volume, and whether the client has made a recent large transaction), information on whether the client was previously authenticated, and a risk score from another authentication application. Partial labels of data were obtained from business experts. A dataset split 604 is shown, with 20% labelled data and 80% unlabelled data. Referring to FIG. 6B, the labelled data was used to first train the classification model using a SVM Model. Once the classification model was trained, it was used as a base classifier and performed self-training on the unlabelled dataset. The benefit of using Semi Supervised models is that it can be used on small portion of labelled datasets which helps in saving costs. Self-training can work on any well-trained supervised base classifier. The self-training semi-supervised classification model is used to make a prediction on a risk level for the client, which in this example may be "low" risk, "medium" risk, or "high" risk as shown at 610. However, it would also be appreciated that the classification model may be trained to calculate different risk levels.

Figure 7:
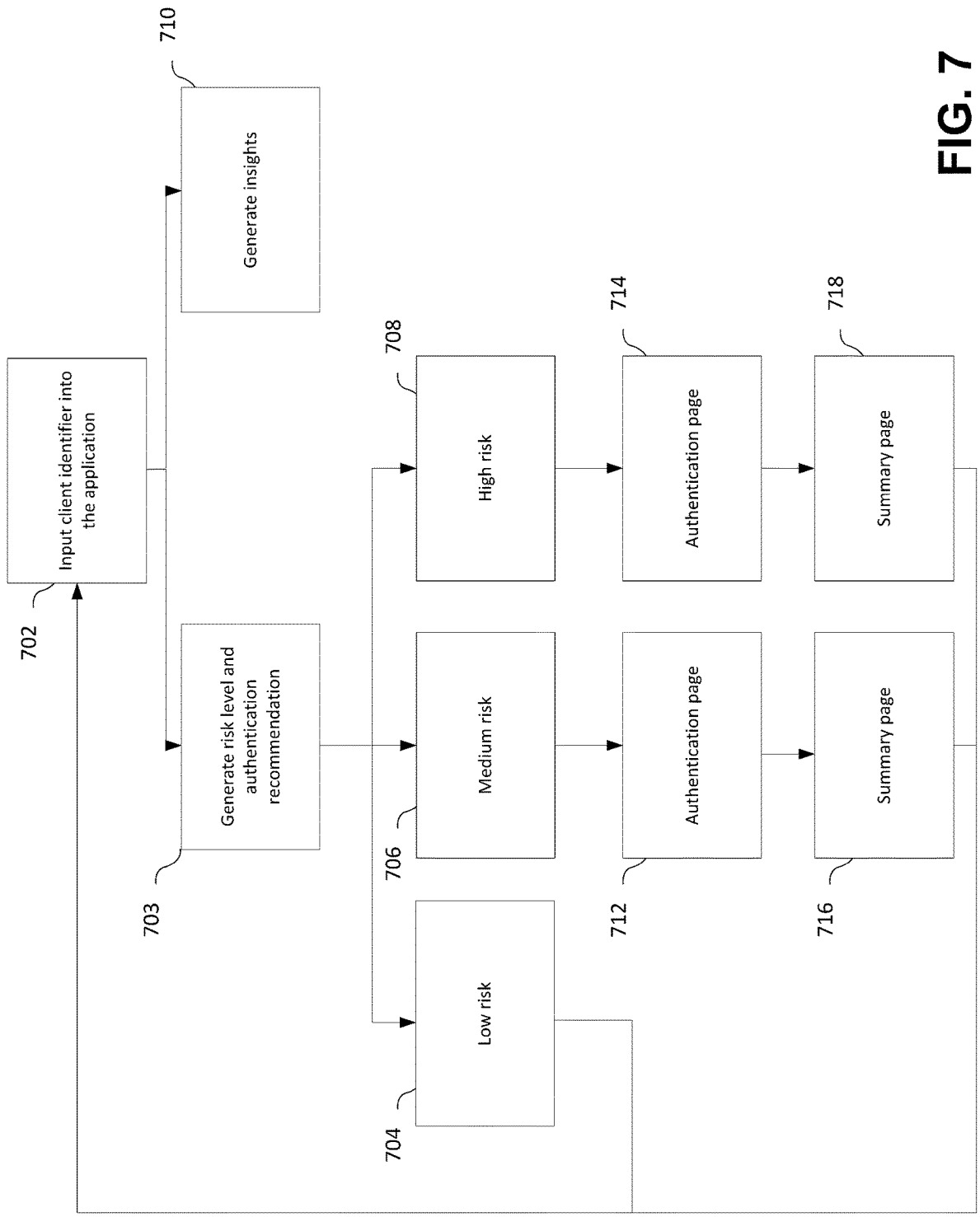
FIG. 7 shows a user flow diagram for a user of the web application facilitating client authentication.

FIG. 7 shows a user flow diagram for a user of the web application facilitating client authentication. A client identifier such a client SRF is input into the application (702). The web application is configured to predict a risk level for the client using the client information and classification model as previously described, and outputs a risk level and authentication recommendation to the user device (703). For instance, the risk level may be classified as low risk level (704), medium risk level (706), or high risk level (708). Based on the determined risk level, the application may instruct the agent to ask a certain number and/or difficulty of authentication questions to the client. Further, the application is configured to generate the authentication questions to be asked, which as previously described can be selected by the application to be non-repetitive questions that are relevant to the client's products. For clients classified to be low risk, it may be determined that no further authentication is required and return to the main input page. For clients classified to be medium and high risk, the user may be presented with an authentication page (712, 714) that displays the authentication questions as well as their respective answers that were automatically generated. Based on the client's answers to the authentication questions, a summary consisting of questions asked and the validity of the client's response can be generated for agents to refer to before proceeding with the call (716, 718). The application may subsequently return to the main input page. The application may also be configured to generate insights (for example: the client address has not changed, phone number has not changed, the client has made one previous call this week, the client's profile was created three years ago, a new credit card was requested one week ago, three transactions were made today, etc.), and can flag particularly relevant insights. The insights can also be displayed for the agent (710). Accordingly, all relevant information (client insights, authentication questions/answers) can be displayed to the agent automatically to help facilitate the authentication process.

Figure 8:
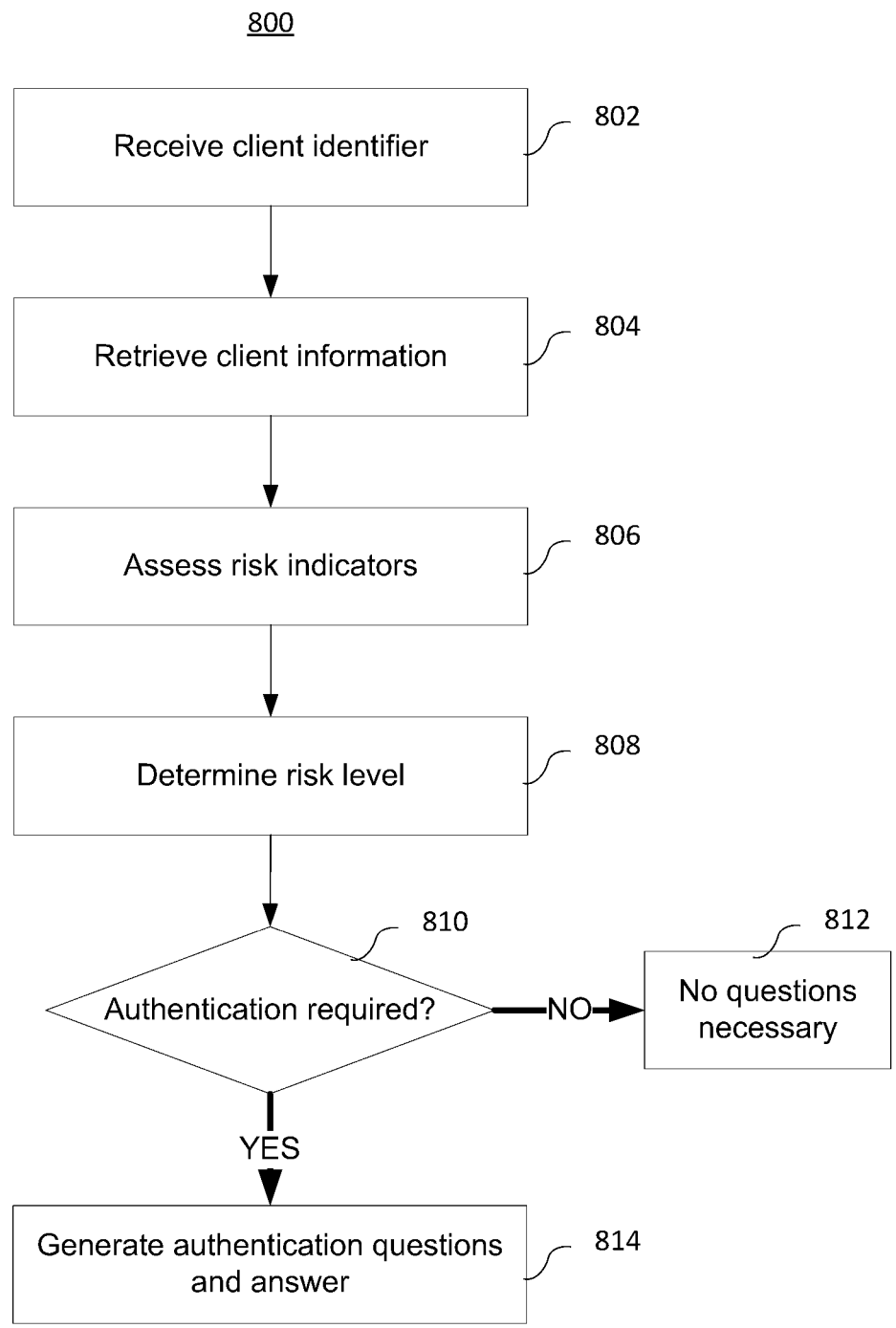
FIG. 8 shows a method of facilitating client authentication.

FIG. 8 shows a method of facilitating client authentication. A client identifier is received (802), and client information is retrieved based on the client identifier (804). A plurality of risk indicators are assessed for the client using the client information (806). For example, the plurality of risk indicators may comprise: whether the client is a new client, whether the client has a recent address or phone number change, whether the client has a high call volume, and whether the client has made a recent large transaction.

A risk level is determined for the client based on the plurality of risk indicators (808). Other inputs may also be used to generate the risk level. For example, a determination may be made as to whether the client has been previously authenticated within a predetermined amount of time. Additionally or alternatively, a real-time risk score for the client calculated from an integrated authentication application may be received. A determination may be made as to whether the client needs to be authenticated based on the risk level for the client (810). If the client does not need to be subject to authentication (NO at 810), then no authentication questions are necessary (812). If the client needs to be authenticated (YES at 810), authentication questions and answers are generated and output for use in authenticating the client (814). The authentication questions and answers may be automatically generated for use in authenticating the client when it is determined that the client needs to be authenticated, and a number and difficulty of the authentication questions generated may be based on the risk level for the client. Irrespective of whether or not the client requires authentication, various client insights may be generated and displayed to the agent.

The processor used in the foregoing embodiments may comprise, for example, a processing unit (such as a processor, microprocessor, or programmable logic controller) or a microcontroller (which comprises both a processing unit and a non-transitory computer readable medium). Examples of computer readable media that are non-transitory include disc-based media such as CD-ROMs and DVDs, magnetic media such as hard drives and other forms of magnetic disk storage, semiconductor based media such as flash media, random access memory (including DRAM and SRAM), and read only memory. As an alternative to an implementation that relies on processor-executed computer program code, a hardware-based implementation may be used. For example, an application-specific integrated circuit (ASIC), field programmable gate array (FPGA), system-on-a-chip (SoC), or other suitable type of hardware implementation may be used as an alternative to or to supplement an implementation that relies primarily on a processor executing computer program code stored on a computer medium.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a challenge" or "the challenge" does not exclude embodiments in which multiple challenges are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

It is contemplated that any part of any aspect or embodiment discussed in this specification can be implemented or combined with any part of any other aspect or embodiment discussed in this specification.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A computer-implemented method for facilitating client authentication, comprising:
receiving an identifier of a client via an application running on a user device;
accessing a client database to retrieve client information based on the identifier of the client;
assessing a plurality of risk indicators for the client from the client information to generate a client dataset for input to a risk level classification model trained to determine a risk level for clients;
determining the risk level for the client using the risk level classification model based on the client dataset comprising the plurality of risk indicators; and
determining, based on the risk level for the client, whether no authentication of the client is required or whether the client needs to be authenticated,
wherein when it is determined that the client needs to be authenticated, the method further comprises:
automatically generating authentication questions and answers for use in authenticating the client, wherein a number and difficulty of the authentication questions is determined based on the risk level for the client, and wherein the difficulty of the authentication questions is determined from statistics of authentication questions previously asked to clients and whether the authentication questions were answered correctly; and
presenting an authentication page on the user device displaying the authentication questions and answers for use in authenticating the client; and
wherein the client is authenticated when it is determined that no authentication of the client is required.

2. The computer-implemented method of claim 1, wherein the authentication questions are generated based on the retrieved client information.

3. The computer-implemented method of claim 1, wherein the plurality of risk indicators comprise one or more risk indicators selected from the group of: whether the client is a new client, whether the client has a recent address or phone number change, whether the client has a high call volume, and whether the client has made a recent large transaction.

4. The computer-implemented method of claim 1, further comprising:
determining whether the client has been previously authenticated within a predetermined amount of time;
wherein determining the risk level for the client using the risk level classification model is further based on the determination of whether the client has been previously authenticated within the predetermined amount of time.

5. The computer-implemented method of claim 1, further comprising:
receiving a real-time risk score for the client calculated from an integrated authentication application;
wherein determining the risk level for the client using the risk level classification model is further based on the real-time risk score.

6. The computer-implemented method of claim 1, further comprising generating and displaying insights related to the plurality of risk indicators.

7. The computer-implemented method of claim 1, wherein the identifier of the client is received automatically when a call with the client is connected, and wherein the client database is automatically accessed in response to receiving the identifier.

8. A system for facilitating client authentication, comprising:
a processor; and
a non-transitory computer-readable memory having computer-executable instructions stored thereon, which when executed by the processor, configure the system receive an identifier of a client via an application running on a user device;
accessing a client database to retrieve client information based on the identifier of the client;
assess a plurality of risk indicators for the client from the client information to generate a client dataset for input to a risk level classification model trained to determine a risk level for clients;
determine the risk level for the client using the risk level classification model based on the client dataset comprising the plurality of assessed risk indicators; and
determine, based on the risk level for the client, whether no authentication of the client is required or whether the client needs to be authenticated,
wherein when it is determined that the client needs to be authenticated, the system is configured to:
automatically generate authentication questions and answers for use in authenticating the client wherein a number and difficulty of the authentication questions is determined based on the risk level for the client, and wherein the difficulty of the authentication questions is determined from statistics of authentication questions previously asked to clients and whether the authentication questions were answered correctly; and
present an authentication page on the user device displaying the authentication questions and answers for use in authenticating the client; and
wherein the system is configured to authenticate the client when it is determined that no authentication of the client is required.

9. The system of claim 8, wherein the authentication questions are generated based on the retrieved client information.

10. The system of claim 8, wherein the computer-executable instructions, when executed by the processor, further configure the system to:
determine whether the client has been previously authenticated within a predetermined amount of time;
wherein determining the risk level for the client using the risk level classification model is further based on the determination of whether the client has been previously authenticated within the predetermined amount of time.

11. The system of claim 8, wherein the computer-executable instructions, when executed by the processor, further configure the system to:
receive a real-time risk score for the client calculated from an integrated authentication application;
wherein determining the risk level for the client using the risk level classification model is further based on the real-time risk score.

12. The system of claim 8, wherein the computer-executable instructions, when executed by the processor, further configure the system to generate and display insights related to the plurality of risk indicators.

13. The system of claim 8, wherein the system is configured to automatically receive the identifier of the client when a call with the client is connected, and wherein the system is configured to automatically access the client database in response to receiving the identifier.

* * * * *